March 8, 1938.  G. PAILIN  2,110,528
CLEATING OR ANCHORING SYSTEM FOR MULTIPLE ELECTRIC WIRES OR PIPES
Filed Jan. 22, 1937  2 Sheets-Sheet 1
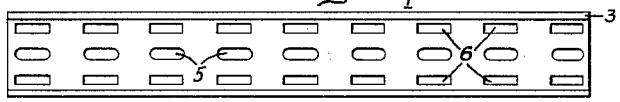 
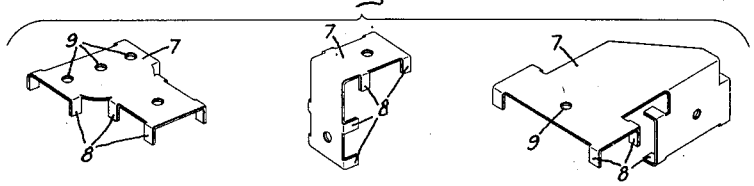
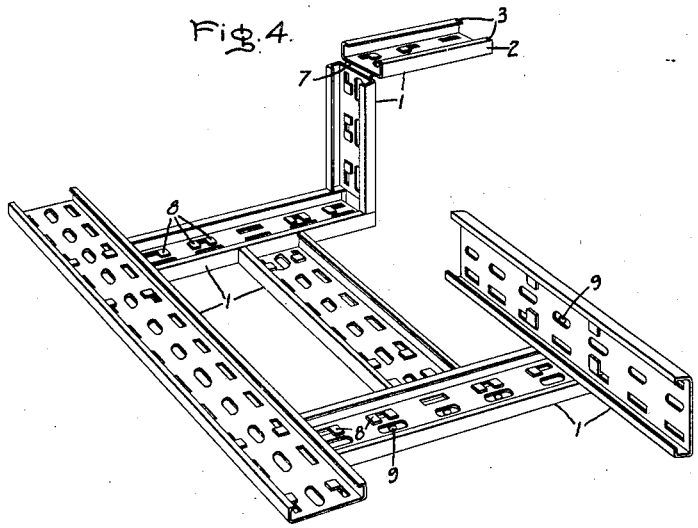
Inventor:
George Pailin,
by Charles E. Tullar
His Attorney.

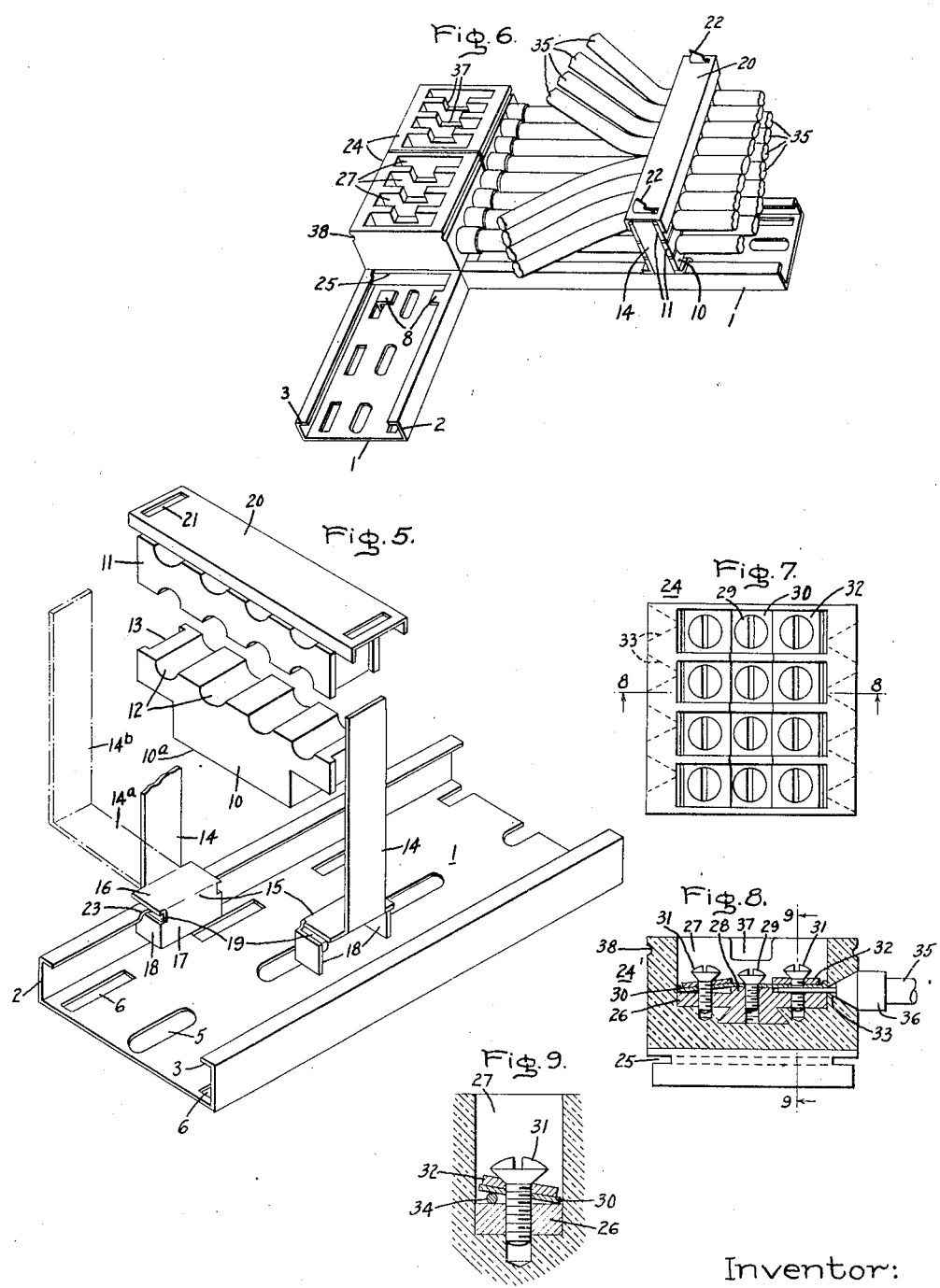

Patented Mar. 8, 1938

2,110,528

UNITED STATES PATENT OFFICE 2,110,528

CLEATING OR ANCHORING SYSTEM FOR MULTIPLE ELECTRIC WIRES OR PIPES

George Pailin, Higher Openshaw, Manchester, England, assignor to General Electric Company, a corporation of New York Application January 22, 1937, Serial No. 121,903
In Great Britain January 14, 1936

6 Claims. (Cl. 247—1)

This invention relates to cleating on anchoring systems for multiple electric wires or pipes and more particularly but not exclusively for the wiring behind the panels of switchgear and other electric control gear wherein specific devices fixed to the front of the panels or behind them or elsewhere are connected together by groups or bunches of wires arranged in neat and organized but often complicated manner and anchored firmly in position such as by means of cleats or the equivalent which are themselves fastened to the panels.

Heretofore such cleats or the like have been fastened to the sheet metal or marble or other panels by means of screws and thus necessitating the drilling of large numbers of holes in particular places in the panels, and usually also the tapping of such holes. Each cleat or the equivalent is often of multiple type comprising a plurality of stacked cross bars, each accommodating a row of wires. Usually the cleat fastening screws pass between the wires. Obviously the drilling and tapping to individual requirements is a lengthy and costly procedure.

The invention is also applicable, for example, to the cleating in requisite relative positions of groups of other members, such as pipes, which may be used in lubricating systems or systems actuated or controlled by fluids at super or subatmospheric pressure.

The object of the present invention is an improved method of and apparatus for the cleating or anchoring of wires, pipes and the like, having various advantages of which the following may be mentioned. Firstly the amount of drilling and tapping of holes in a panel or the like can be considerably reduced. Secondly, and to some extent consequentially, the volumetric or boundary space of the wiring or piping groups or runs can be reduced. Thirdly, the actual wiring or pipe laying process is facilitated, and may even in many cases be performed or mainly performed elsewhere than in situ. Other advantages will hereinafter become apparent to those skilled or employed in the art.

Broadly the invention consists in cleating the wires, pipes or the like, conveniently in the manner hereinafter described, to an independent framework which can be readily secured to the panel or the equivalent at a relatively small number of places, thus obviating the drilling and tapping of large numbers of holes. The member or members constituting the framework is or are of such a form in cross-section that the actual cleat members and also terminal or junction members may be readily secured to said frame members in any position thereon, whilst lengths of the latter may be readily secured together to form simple or complicated frame structures. Preferably the frame members are individually cut, in accordance with particular requirements, from lengths of uniform or standard section. Preferably the section is of shallow channel form, with inturned flanges or webs beneath which correspondingly shaped parts of the cleats or terminal blocks may be retained, conveniently as hereinafter described.

The different members constituting the framework may be connected rigidly together by additional members which may be referred to as being of the fishplate type. For general convenience in securing the frame members to a panel or the equivalent, in securing them to one another and in securing devices thereto standard material may be provided at regular intervals along its length with perforations or slots or transverse groups of, say, three perforations or slots, the slots being longitudinally disposed in the channel strip. The fishplate connectors may have slots or perforations therein, and preferably they have upstanding tongues located so that they may be passed through appropriate slots or perforations in the frame members and then bent over. The fishplate members may be made in several stock shapes permitting the frame members to be secured together at various angles and in different planes, and permitting the affixing to the frame members of special devices such as terminal blocks for multicore flexible cables or "jumpers" such as for linking devices on a hinged door panel with devices located within a cubicle behind the panel.

The devices secured to the frame members may have flanges or grooves corresponding with the inturned flanges of the frame members so that said devices may be entered upon the end of a frame member and slid along the latter to the required position where the devices can readily be secured by deforming the flange or flanges at each end of the device. In this manner may be secured, for example, moulded insulation blocks for terminals or connectors which may be of any convenient type, but are preferably as hereinafter set forth.

The cleats proper may be in general of ordinary form comprising cross pieces such as of insulating material, each having a row of grooves of semi-circular section for the accommodation of a group of insulated wires (or of pipes), and a plurality of such cross pieces may be stacked one upon the other so as to carry between each pair a group of wires (or pipes). Said cross pieces have at their ends recesses for engaging between a pair of uprights adapted to be secured to the channel frame members. Each of said uprights comprises a strip of metal bent at one end to form a pedestal which is slotted to correspond with the flange of the frame member. Said two uprights become properly located on the frame member by the interposition of the lowermost cross piece and can be finally locked in position by deforming the flanges of the frame members. The uprights can be cut to the required length before or after assembly, and their free ends can finally be bent in or otherwise deformed so as to retain the stack of cross-pieces in position, preferably after finally adding a metal cross strip.

According to a subsidiary feature of the invention the multiple terminal or connecting member may be made square in plan and grooved or equivalently shaped on all four sides so that it can be engaged, as desired, in a frame member in relative positions at right angles.

Conveniently the terminal or connecting member is a moulded block having a plurality of cells or troughs each housing a terminal member proper. A preferred form of terminal or connecting member proper comprises a base bar moulded into the block and forming the floor of a cell said bar being provided with three tapped holes in line. Spaced from and centrally secured to the base bar is a parallel resilient strip also having three holes (untapped) to correspond with the holes in the base bar at each end of which is a clamping screw. The moulded block is provided on two opposite sides with holes to receive the bared conductor wire ends. Each hole is located so that a wire end pushed through it will pass to one side of the clamping screw, and the arrangement is thus such that when said screw is screwed down the wire end is firmly clamped between the base bar and the strip.

It will be appreciated that the runs of wiring can be covered in if desired such as by members of channel section.

To enable the invention to be clearly understood and carried into effect, it will now be described by way of example with reference to the accompanying drawings in which:

Figure 1 is a plan on a reduced scale of a length of the preferred uniform or standard frame material, and Fig. 2 an end view thereof.

Fig. 3 shows in perspective view five different forms of fishplate connectors.

Fig. 4 is a perspective view showing seven members of standard frame material connected together to form a rigid framework which may be wired and secured for example behind a switchgear panel.

Fig. 5 is a perspective view on a larger scale illustrating the preferred cleating arrangement.

Fig. 6 is a perspective view on a larger scale of a portion of a framework having a group of wires cleated thereto and terminal blocks carried thereon.

Fig. 7 is a plan, Fig. 8 a sectional elevation on the line VIII—VIII of Fig. 7, and Fig. 9 a part section on the line IX—IX of Fig. 8, of a preferred form of terminal block for use in the system of the invention.

Referring first more particularly to Figs. 1, 2 and 5 of the accompanying drawings, the length 1 of stock material therein illustrated comprises a strip of mild steel or other material about $\frac{1}{32}$ inch thick, pressed or rolled to a channel section having a base which is about 1¾ inches wide, sides 2 which are about ⅜ inch upstanding from the base, and inturned flanges 3 which are about $\frac{3}{16}$ inch, outside dimensions being given. Such material can be made in pieces of considerable length from which frame members of required lengths can be readily cut by a tool or machine.

As shown in Fig. 1, the base of the member 1 is provided with transverse rows of three slots, namely inner slots 5 having semi-circular ends and outer slots 6 having square ends. The slots are conveniently arranged at a longitudinal pitch of about 1¼ inches. The outer slots may each be about ⅛ inch wide, the middle slots $\frac{3}{16}$ or ¼ inch wide and all the slots may be about ½ or ⅝ inch long. With frame members of these dimensions the usual four insulated conductors can be nicely accommodated longitudinally of the member as will hereinafter appear.

The fishplate connectors shown in Fig. 3 comprise in general flat or bent main portions 7 provided with right-angle tongues 8 which latter, for joining together frame members 1, can be passed through appropriate slots 6 in the latter and hammered or otherwise bent over, as will be clearly followed from an inspection of Fig. 4, which shows a framework comprising seven members 1 united by seven appropriate fishplate connectors disposed beneath or behind said frame members. These connectors are provided with holes 9 which may be used as found expedient for fastening a more or less complicated built-up framework such as shown in Fig. 4, by means of screws, behind a panel or other part of an electrical switchgear unit or other apparatus. It will be appreciated that with the use of the standard material 1 and fishplate connectors 7, the most usual forms of which are shown in Fig. 3, simple or complicated frameworks may be readily constructed in accordance with a great many wiring requirements. It will be apparent referring to Fig. 4, that the so-called fishplates or junction plates are adapted to join the frame members or sections 1 in continuous relation, right angle relation, and transverse right angle relation.

Referring next to Figs. 5 and 6, in order to secure switchboard wiring to a previously built-up framework such as shown in Fig. 4 and a portion of which is shown in Fig. 6, the wiring which runs longitudinally of a frame member 1 is secured thereto by means of cleats 10 and 11, which are in the form of bars preferably of insulating material having cross grooves 12 and vertical end channels 13. These cleats may be of length sufficient to accommodate four wires as shown in Fig. 5 or they may be of length to accommodate more wires, say eight wires as shown in Fig. 6. These cleat members are held upon the frame members 1 by means of the uprights 14, which, along with two cleats 10 and 11, are shown separated in Fig. 5, whilst in Fig. 6 they are shown in final position on a frame member. Each such upright is formed of strip material such as brass, bent so as to provide a pedestal portion 15, the form of which is clearly shown in Fig. 5. The pedestal portion preferably comprises a horizontal part 16 and a vertical part 17 having two wings 18 at right-angles, providing in effect a slot 19 adapted to fit on the inturned flange 2 of the frame member 1 as clearly shown in Fig. 5.

It will be understood that when a co-operating pair of uprights 14 have been engaged opposite one another on a frame member 1, they will be retained in position on the flanges 3 by the insertion of the lowermost cleat 10, which, as shown in Fig. 5, is formed with a spacer portion 10a the ends of which bear against the vertical portions 17 of the pedestals 15, so that the uprights are securely held on the frame member 1. A run of wires can then be laid in position in the grooves 12 of the cleat 10 and a cleat 11 having grooves 12 on both faces can then be inserted in position and receive another run of wires, after which a third cleat is placed in position, and so on. This third or last cleat is then covered by means of a metal clamping bar 20 which is conveniently of channel section as shown and has at each end a slot 21 through which the free end of the upright 14 passes. The clamping bar 20 can then be retained in position by bending over or twisting the free ends of the uprights 14 as is clearly indicated at 22 in Fig. 6. The uprights 14 may be finally locked in position upon the frame member 1 by deforming the flange 3 of the latter on each side of the grooved pedestal portion 15 of the upright, as is indicated at 23 in Fig. 5.

In Fig. 6 it will be noticed that there are eight wires held between each pair of cleats, and to enable this to be done, that upright 14 which is not visible in Fig. 6 is made as indicated by dotted lines in Fig. 5. That is to say, the upright first extends horizontally from the pedestal portion 16, as indicated at 14a, for a sufficient distance to accommodate the extra wires, and then upwardly as indicated at 14b.

In Fig. 6 are also shown a pair of terminal or connecting blocks 24, one of which is shown separately in Figs. 7 and 9 in plan and sectional elevation respectively, the contact members being omitted for simplicity from the block 24 shown in Fig. 6. The blocks 24 are provided with grooves 25 adapted to be entered by the inturned flanges 3 of the frame members 1, that is to say a terminal block 24 can be entered on to the end of a member 1 and slid along the latter to the required position, and there fixed by deforming the flange 3. Conveniently the blocks 24 are square in plan and have a groove 25 on all four sides so that in accordance with requirements the blocks can be arranged relatively at right angles to each other to receive wires coming from different directions at right angles.

Referring now more especially to Figs. 7 and 8, each terminal block is formed of a mouldable insulating material and carries a metal base bar 26 which is preferably moulded into the block and forms the floor of a cell 27 of which there are four in each block as clearly shown. Each cell may be about ½ inch deep and ⅜ inch wide. The bar 26 is provided with three tapped holes in line and with a stepped central part 28 or a washer, and secured to the central hole by a screw 29 is a resilient strip 30. Through the two end holes of the resilient strip 30 pass clamping screws 31 which engage the screw-threaded end holes of the base bar 26, washers 32 being interposed between the strip 30 and the heads of the screws 31. The screws 31 are preferably countersunk, and the washers 32 slightly countersunk. The washers are preferably square or rectangular and of such width that their rotation will be prevented by the sides of the cells 27. Each washer 32, with the plate 30 in between, rests at its edge on the edge of the raised step of the base bar 26.

At the sides of the insulation block 24 are provided countersunk holes 33 through which the bared ends 34 of the wires 35 carried by the frame members and cleats can be passed until they extend beneath the resilient plate 30 between which and the base bar 26 said wire ends can be firmly clamped by screwing down the end screws 31, by which operation the plate 30 necessarily becomes twisted, shown in Fig. 9, so that it bites into the thread of the screws 31 which is thereby effectively locked against rotation in spite of severe and prolonged vibration. At 36 are shown ferrules on the wire-ends 35. Slots 37 may be provided in the partitions between the cells so that electrical connection may be made between the metal terminals or connectors in said cells. The blocks 24 may be grooved at their upper edges as shown at 38 for the reception of flanges of cover members for the blocks.

It will be understood that numerous minor modifications may be made within the scope of the invention. For example, within certain aspects of the appended claims, the main frame members 1 need not be of the exact form shown more particularly in Figs. 1 and 2 since each pair of cleat uprights 14 may be combined as a U-shaped or channel-section member and fastened to the frame member 1 by a bolt and nut; the pedestal portions of separate uprights 15 may be of other form than that shown in Fig. 5; thus the strip 14 may be bent laterally and back again to provide a groove which fits on the flange 3 or the pedestal portion may be a grooved solid member; the terminal or connecting blocks 24 may be secured by screws to the frame members; the fishplate connectors 7 may be made without the tongues 8 and be fastened to the frame members 1 by means of bolts and nuts; the actual terminal or connecting members in the insulating blocks may be of any other convenient form than that shown in Figs. 7, 8 and 9.

I claim:

1. In panel mounted apparatus, an independent supporting framework for multiple electric conductors and the like comprising a channel-shaped metallic strip, cleating means secured with respect to opposite flanges of said strip and bridging said flanges for supporting said conductors in fixed parallel relation to said strip, and means for detachably securing said strip to the panel.

2. In panel mounted apparatus, an independent supporting framework for multiple electric conductors and the like comprising a plurality of channel-shaped strips, said strips having perforations between the lateral flanges thereof, joining plates having means for coacting with said slots for joining a plurality of said strips as an integral framework in either continuous or angular relation, cleating means coacting with said lateral flanges of said strips and spaced from said perforated portion for supporting said conductors in fixed parallel relation to the corresponding strips, and means for securing said framework to the panel.

3. In panel mounted apparatus, an independent supporting framework for multiple electric conductors and the like comprising a plurality of channel-shaped metallic strips, the portions of said strips between the opposite lateral flanges thereof having perforations therein, a plurality of joining plates provided with tabs adapted to coact with the said perforations for joining said strips in continuous relation, in right angle relation and in transverse right angle relation as an integral framework, means for supporting said conductors in parallel relation to said strips, and means for securing said framework as an integral unit to the panel.

4. In panel mounted apparatus, a supporting framework for multiple electric conductors and the like comprising a channel-shaped section, a pair of insulating members for cleating said conductors in parallel relation to said section, supporting members coacting with and extending from the opposite lateral flanges of said section for positioning said insulating members, one of said insulating members coacting with said supporting members for holding the same with respect to said section, and means coacting with said supporting members for holding said insulating member in cleating relation to said conductors.

5. In panel mounted apparatus, a supporting framework for multiple electric conductors and the like comprising a channel-shaped section, the opposing lateral sides of which are provided with inwardly extending flanges, a pair of insulating members for cleating said conductors in parallel relation to said section, a pair of supporting members between which said insulating members are mounted, means for interlocking the base portions of said supporting members with respect to said lateral sides including said inwardly extending flanges, one of said insulating members having means for bracing said base portions so as to hold the same against the inner side walls of said section, said supporting members being adapted to receive therebetween another pair of substantially similar insulating members for cleating a second group of conductors in spaced parallel relation to said first-named conductors, and a member interconnecting said supporting members for holding said insulating members in cleating position.

6. In panel mounted apparatus, an independent supporting framework for multiple electric conductors and the like comprising a plurality of channel-shaped sections, means for joining said sections in continuous or angular relation as an integral framework, cleating means secured to said sections for supporting said conductors in fixed parallel relation thereto, the opposite side walls of said sections having inwardly turned flanges, an insulating junction box for receiving said conductors mounted at a junction point of said sections with respect to one of said sections, the base of said junction box having means for coacting with the inwardly turned flanges of said section so that said junction box can be locked with respect to said section by insertion of said block into the section from an end thereof.

GEORGE PAILIN.